United States Patent
Kagaya

(10) Patent No.: US 10,909,062 B2
(45) Date of Patent: Feb. 2, 2021

(54) CIRCUIT DEVICE AND ELECTRONIC APPARATUS

(71) Applicant: SEIKO EPSON CORPORATION, Tokyo (JP)

(72) Inventor: Ryuichi Kagaya, Chino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/781,230

(22) Filed: Feb. 4, 2020

(65) Prior Publication Data

US 2020/0250122 A1 Aug. 6, 2020

(30) Foreign Application Priority Data

Feb. 5, 2019 (JP) ................................. 2019-018677

(51) Int. Cl.
*G06F 13/40* (2006.01)
*G06F 13/42* (2006.01)

(52) U.S. Cl.
CPC ...... *G06F 13/4068* (2013.01); *G06F 13/4282* (2013.01); *G06F 2213/0042* (2013.01)

(58) Field of Classification Search
CPC ............. G06F 13/4068; G06F 13/4282; G06F 2213/0042
See application file for complete search history.

(56) References Cited

U.S. PATENT DOCUMENTS

| 5,305,267 A | * | 4/1994 | Haraguchi | G11C 29/46 365/201 |
| 2007/0030035 A1 | | 2/2007 | Komatsu et al. | |
| 2011/0148470 A1 | | 6/2011 | Inoue | |
| 2015/0035477 A1 | * | 2/2015 | Wong | H02J 7/007 320/107 |
| 2016/0028252 A1 | * | 1/2016 | Bajpai | H02J 7/0029 320/106 |
| 2018/0212796 A1 | | 7/2018 | Kamihara et al. | |

FOREIGN PATENT DOCUMENTS

| JP | 2003-241870 A | 8/2003 |
| JP | 2007-026196 A | 2/2007 |
| JP | 2007-073036 A | 3/2007 |
| JP | 2011-129042 A | 6/2011 |
| JP | 2015-084198 A | 4/2015 |
| JP | 2019-079132 A | 5/2019 |

* cited by examiner

*Primary Examiner* — Henry Tsai
*Assistant Examiner* — John B Roche
(74) *Attorney, Agent, or Firm* — Oliff PLC

(57) ABSTRACT

A circuit device includes a first physical layer circuit to which a first bus with a USB standard is coupled, a second physical layer circuit to which a second bus with the USB standard is coupled, and a bus monitor circuit monitoring the first bus and the second bus, in which the first physical layer circuit includes a first disconnect detection circuit which detects device disconnect in the first bus, the bus monitor circuit includes a first test signal detection circuit which detects whether or not a test signal is output to the first bus, and when detection of the device disconnect by the first disconnect detection circuit is disabled, detection of the test signal by the first test signal detection circuit is disabled.

7 Claims, 13 Drawing Sheets

CIRCUIT DEVICE AND ELECTRONIC APPARATUS

The present application is based on, and claims priority from JP Application Serial Number 2019-018677, filed Feb. 5, 2019, the disclosure of which is hereby incorporated by reference herein in its entirety.

BACKGROUND

1. Technical Field

The present disclosure relates to a circuit device and an electronic apparatus, for example.

2. Related Art

In related art, as a technology which controls data transfer using Universal Serial Bus (USB), for example, a technology described in JP-A-2007-73036 is known. When transferring data using the USB, a circuit device may be provided between a host apparatus on a control side and a device apparatus on a controlled side.

However, when the device apparatus is reconnected after the device apparatus is disconnected, the device apparatus enters into a state called FS_IDLE, and the circuit device may erroneously determine that a test signal is sent under the state.

SUMMARY

A circuit device according to an aspect of the present disclosure includes a first physical layer circuit to which a first bus with a USB standard is connected, a second physical layer circuit to which a second bus with the USB standard is connected, a bus switch circuit turning on or off a connect between the first bus and the second bus, a processing circuit performing transfer processing which transmits a packet received from the first bus via the first physical layer circuit to the second bus via the second physical layer circuit and transmits a packet received from the second bus via the second physical layer circuit to the first bus via the first physical layer circuit, during a period in which the bus switch circuit is turned off, and a bus monitor circuit monitoring the first bus and the second bus, in which the first physical layer circuit includes a first disconnect detection circuit which detects device disconnect in the first bus, the bus monitor circuit includes a first test signal detection circuit which detects whether or not a test signal is output to the first bus, and when detection of the device disconnect by the first disconnect detection circuit is disabled, detection of the test signal by the first test signal detection circuit is disabled.

DESCRIPTION OF EXEMPLARY EMBODIMENTS

Hereinafter, a circuit device according to an embodiment of the present disclosure will be described with reference to the drawings.

Figure 1:
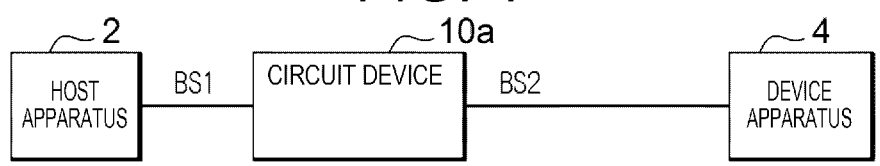
FIG. 1 is a diagram illustrating a connect between a circuit device and other apparatus according to an embodiment.

FIG. 1 is a diagram illustrating a connect among a circuit device 10a, a host apparatus 2, and a device apparatus 4 according to the embodiment.

As shown in the figure, the circuit device 10a is connected to the host apparatus 2 via a bus BS1, and is connected to the device apparatus 4 via a bus BS2. Here, the circuit device 10a functions as a USB relay between the host apparatus 2 and the device apparatus 4.

The device apparatus 4 is specifically, for example, a memory card, Bluetooth (registered trademark) apparatus, dedicated short range communications (DSRC), or the like, and is apparatus controlled by the host apparatus 2. The buses BS1 and BS2 are USB standard buses including a signal line such as signals DP and DM for differential transmission.

The bus BS1 is an example of a first bus, and the bus BS2 is an example of a second bus. The buses BS1 and BS2 can include signal lines of a power supply VBUS and a GND. Further, the present embodiment is not limited to such connect.

Figure 2:
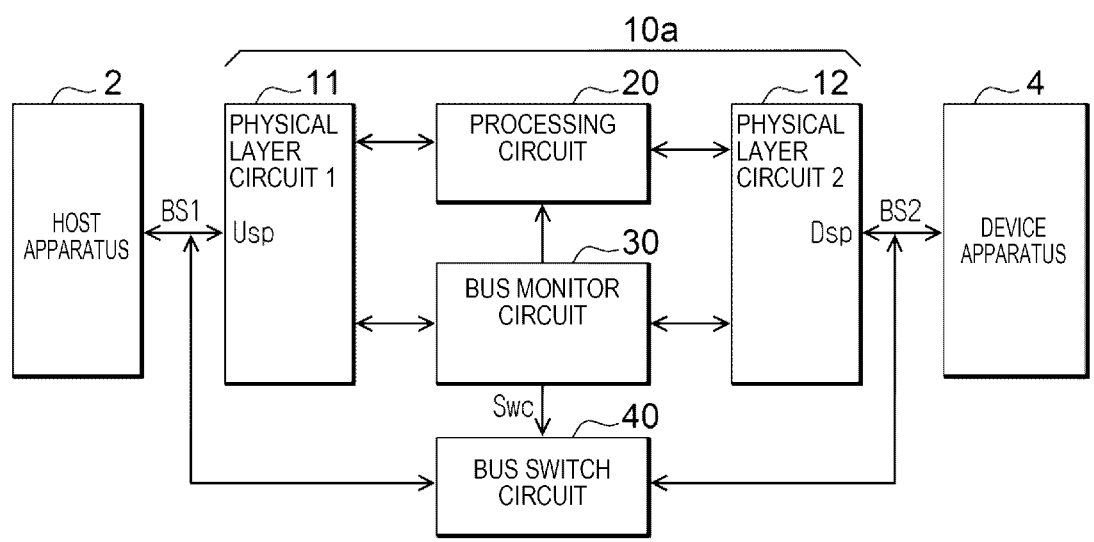
FIG. 2 is a diagram illustrating a connect between a configuration of a main portion of the circuit device and other apparatus.

FIG. 2 is a block diagram illustrating a schematic configuration of the circuit device 10a. In FIG. 2, the circuit device 10a includes physical layer circuits 11 and 12, a processing circuit 20, a bus monitor circuit 30, and a bus switch circuit 40.

The physical layer circuit 11 is an example of a first physical layer circuit, and the physical layer circuit 12 is an example of a second physical layer circuit. In FIG. 2, □1□ is assigned to the physical layer circuit 11 to distinguish the physical layer circuit 11 from the physical layer circuit 12. In a similar manner, □2□ is assigned to the physical layer circuit 12 to distinguish the physical layer circuit 12 from the physical layer circuit 11.

The bus BS1 is connected to the physical layer circuit 11, and the bus BS2 is connected to the physical layer circuit 12. The physical layer circuits 11 and 12 are constituted with physical layer analog circuits. Examples of the physical layer analog circuits include a transmission circuit, a reception circuit, various detection circuits, and a pull-up resistor.

The bus monitor circuit 30 monitors the bus BS1 based on a signal output from the physical layer circuit 11, monitors the bus BS2 based on a signal output from the physical layer circuit 12, and outputs a signal Swc to the bus switch circuit 40 based on a corresponding monitoring result.

The bus switch circuit 40 is turned on or off between the buses BS1 and BS2 according to the signal Swc. Specifically, the bus switch circuit 40 is turned on when the signal Swc is at an H level and turned off when the signal Swc is at an L level.

The bus monitor circuit 30 determines an operation mode based on a monitoring result of the bus BS1 and the bus BS2. The operation modes are a high speed (HS) mode and a full speed (FS) mode in the USB standard, and the bus monitor circuit 30 notifies a determined operation mode by a signal Mod described later.

Figure 5:
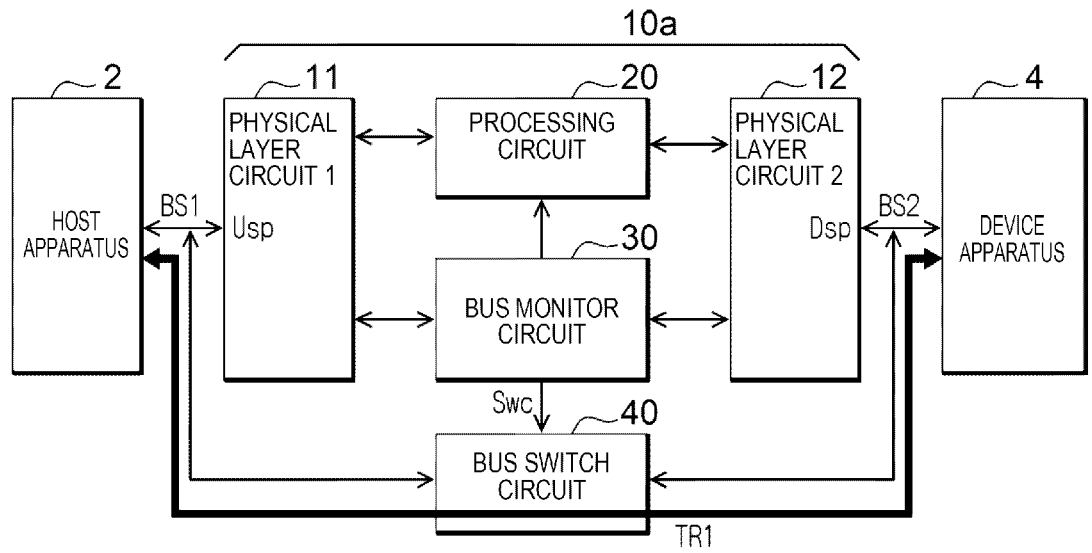
FIG. 5 is a diagram illustrating a transfer route between the circuit device and other apparatus.

Further, when the bus monitor circuit 30 determines that the HS mode is not possible based on the monitoring result of the bus BS1 and the bus BS2, the bus monitor circuit 30 sets the signal Swc to the H level and turns on the bus switch circuit 40. When the bus switch circuit 40 is turned on, as shown in FIG. 5, a packet or the like is transferred between the host apparatus 2 and the device apparatus 4 via a route TR1 which bypasses the processing circuit 20.

Figure 6:
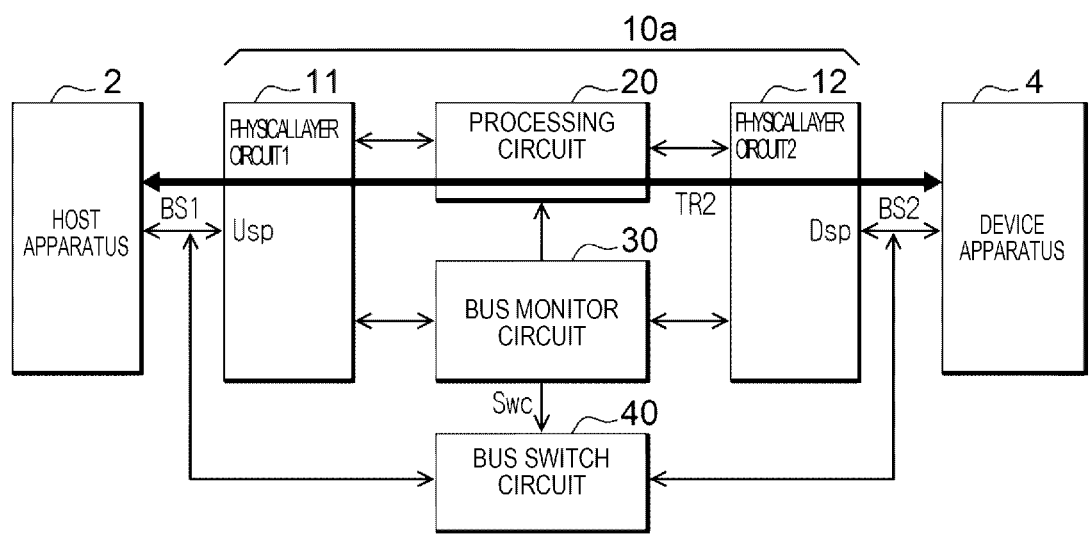
FIG. 6 is a diagram illustrating a transfer route between the circuit device and other apparatus.

If the bus monitor circuit 30 determines that the HS mode is possible based on the monitoring result of the bus BS1 and the bus BS2, the bus monitor circuit 30 sets the signal Swc to the L level and turns off the bus switch circuit 40. If the bus switch circuit 40 is turned off, as shown in FIG. 6, a packet or the like is transferred between the host apparatus 2 and the device apparatus 4 via a route TR2 which goes through the processing circuit 20.

The processing circuit 20 is a circuit which performs various processing such as transfer processing, and is constituted with a logic circuit such as a gate array. The processing circuit 20 may be constituted with a processor such as a CPU or an MPU.

Specifically, the processing circuit 20 transmits a packet in the bus BS1 received via the physical layer circuit 11 to the bus BS2 via the physical layer circuit 12, and also transmits a packet received from the bus BS2 via the physical layer circuit 12 to the bus BS1 via the physical layer circuit 11. The processing circuit 20 also performs processing such as resynchronization of a bit of a packet during the transfer processing.

The processing circuit 20 performs the transfer processing or the like without changing a packet format during part or all of a period in which the bus switch circuit 40 is turned off.

Figure 3:
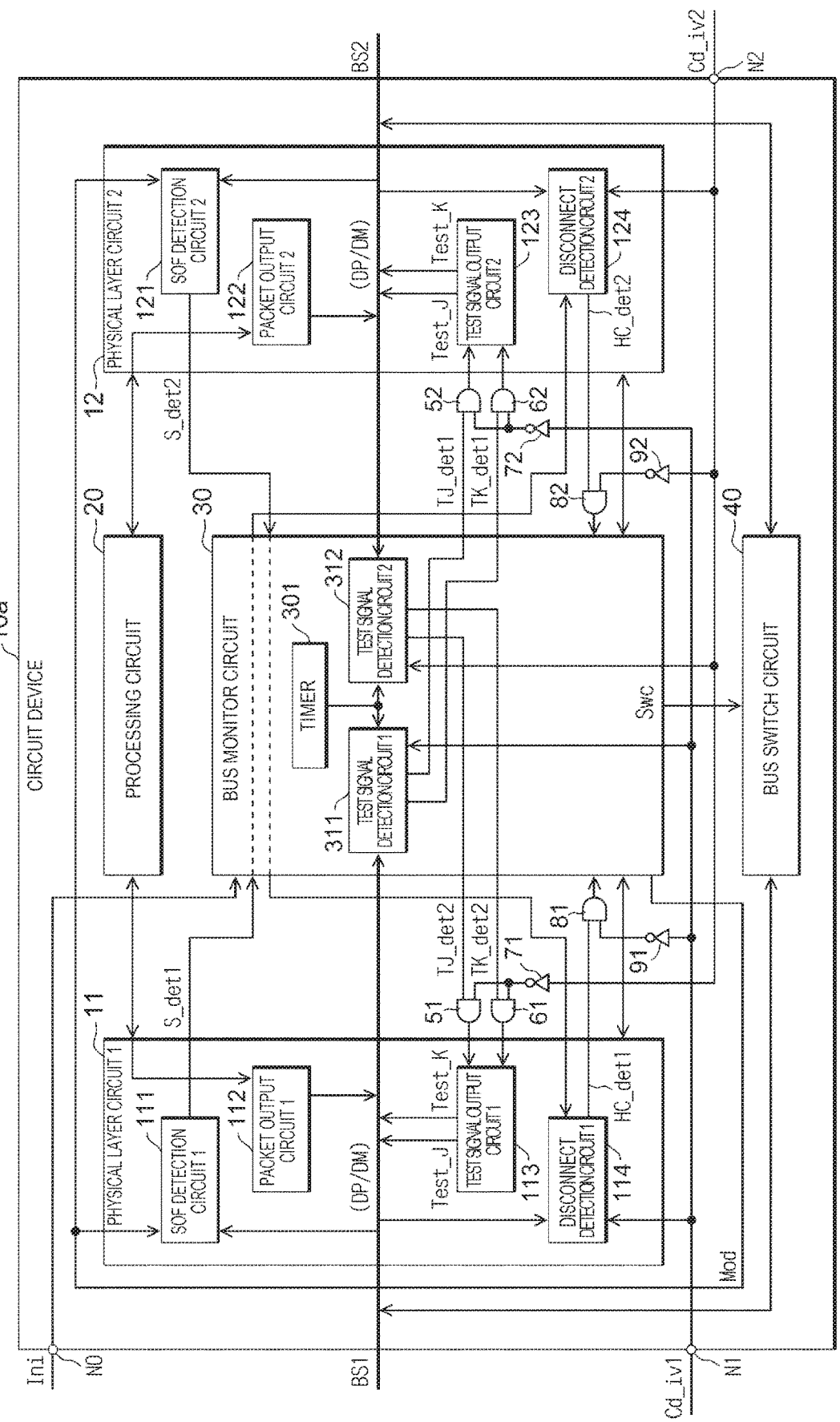
FIG. 3 is a diagram illustrating a configuration of the circuit device.

FIG. 3 is a diagram showing a configuration of the circuit device 10a in more detail. In FIG. 3, the bus monitor circuit 30 includes a timer 301 and test signal detection circuits 311 and 312. Further, the physical layer circuit 11 includes an SOF detection circuit 111, a packet output circuit 112, a test signal output circuit 113, and a disconnect detection circuit 114. In a similar manner to the physical layer circuit 11, the physical layer circuit 12 includes an SOF detection circuit 121, a packet output circuit 122, a test signal output circuit 123, and a disconnect detection circuit 124.

In FIG. 3, □1□ is assigned to elements provided in the physical layer circuit 11 to distinguish the elements from elements provided in the physical layer circuit 12. In a similar manner, □2□ is assigned to the elements provided in the physical layer circuit 12 to distinguish the elements from the elements provided in the physical layer circuit 11.

The packet output circuit 112 is used to output a packet supplied to the bus BS2 to the bus BS1 on an opposite side via the processing circuit 20 when the HS mode is set. The packet output circuit 122 is used to output a packet supplied to the bus BS1 to the bus BS2 on an opposite side via the processing circuit 20 when the HS mode is set.

In the example, an amplitude level of the packet can be amplified in an arbitrary range.

Signal data transferred according to the USB standard is constituted with a □frame□ as a unit, and the □frame□ is constituted with a plurality of □transactions□ following a packet called a start of frame (SOF). The □transaction□ is a unit in which significant data transmission/reception is completed, and is constituted with a plurality of packets. The packet is a minimum unit of data transferred according to the USB standard, and is divided into several types including the SOF.

The packet includes a packet identifier (PID), and the PID indicates a type of the packet. Whether or not the packet is the SOF is specified by the PID included in the packet. Further, an end of packet (EOP) indicates an end of the packet. In the EOP of the SOF, amplitude levels of the signals DP and DM constituting a differential signal are fixed for a predetermined time, so that an amplitude level of the EOP is compared with a disconnect detection level as a threshold value, and thus, device disconnect can be detected.

In the USB, a similar physical layer circuit is also provided in host apparatus and device apparatus. Although not shown in particular, a termination resistor is provided in the physical layer circuit of the device apparatus or the like, such that for example, when the device apparatus 4 is disconnected, the termination resistor of the device apparatus 4 is removed from the circuit device 10a and the signal amplitudes of the signals DP and DM increase. Therefore, when the amplitude levels of the signals DP and DM exceed the disconnect detection level, it can be detected that the device is disconnected.

When an operation mode indicated by the signal Mod output from the bus monitor circuit 30 is switched from the FS mode to the HS mode, the SOF detection circuit 111 enters an enable state, that is, an operation state. Further, the SOF detection circuit 111 analyzes the PID included in the packet of the bus BS1 one by one, and when an SOF is detected in the analysis, the SOF detection circuit 111 notifies the bus monitor circuit 30 and the disconnect detection circuit 124 of the detection by a detection signal S_det1.

In a similar manner for the SOF detection circuit 121, when the operation mode is switched to the HS mode, the SOF detection circuit 121 is enabled, and when the SOF is detected in the packet supplied to the bus BS2, the SOF detection circuit 121 notifies the bus monitor circuit 30 and the disconnect detection circuit 114 of the detection of the SOF by a detection signal S_det2.

Accordingly, the bus monitor circuit 30 can recognize whether the host apparatus 2 is connected to the bus BS1 or BS2. In the connect example of FIG. 1, it is recognized that the host apparatus 2 is connected to the bus BS1.

The bus monitor circuit 30 is configured to supply the detection signal S_det1 to the disconnect detection circuit 124 in synchronization with a clock and supply the detection signal S_det2 to the disconnect detection circuit 114 in synchronization with the clock. In the configuration, a disconnect detection circuit between the disconnect detection circuits 114 and 124, in which the SOF is not detected, is in an operating state in principle. In the connect example of FIG. 1, since the host apparatus 2 is connected to the bus BS1, the one in which the SOF is not detected is the disconnect detection circuit 124 corresponding to the bus BS2. Therefore, in the connect example of FIG. 1, in the HS mode, the disconnect detection circuit 124 is in an operating state in principle.

The disconnect detection circuit 114 detects an amplitude level of the EOP of the SOF output to the bus BS1 in the operating state. If the amplitude level of the EOP exceeds the disconnect detection level, the disconnect detection circuit 114 determines that the device connected to the bus BS1 is disconnected, and outputs a detection signal HC_det1 at the H level.

The disconnect detection circuit 114 enters a disable state, for example, a stopped state, as an exception when a disconnect detection disable signal Cd_iv1 supplied from an outside via a terminal N1 is at the H level.

In a similar manner, the disconnect detection circuit 124 in the operating state detects an amplitude level of the EOP of the SOP output to the bus BS2, determines whether or not the device connected to the bus BS2 is disconnected, and outputs a detection signal HC_det2 at the H level if it determines that the apparatus is disconnected.

The disconnect detection circuit 124 enters a disable state as an exception when a disconnect detection disable signal Cd_iv2 supplied from an outside via a terminal N2 is at the H level.

A disconnect detection level used for disconnect detection determination can be set within a range of 525 mV to 625 mV.

Further, when the disconnect detection circuit 114 or 124 notifies the bus monitor circuit 30 of the device disconnect, the bus monitor circuit 30 outputs the signal Mod which sets the operation mode to the FS mode, and sets the signal Swc to the H level to turn on the bus switch circuit 40. With the turning on, a route of a signal such as a packet transferred between the host apparatus 2 and the device apparatus 4 is switched from the route TR2 via the processing circuit 20 to the route TR1 via the bus switch circuit 40.

The test signal detection circuit 311 samples a signal sent to the bus BS1 with a clock from the timer 301 when the operation mode is the HS mode, outputs a detection signal TJ_det1 at the H level when a test signal Test_J is detected, and outputs a detection signal TK_det1 at the H level when a test signal Test_K is detected.

The detection signal TJ_det1 is supplied to the test signal output circuit 123 via one of input ends of an AND circuit 52, and the detection signal TK_det1 is supplied to the test signal output circuit 123 via one of input ends of an AND circuit 62.

If the disconnect detection disable signal Cd_iv1 is at the H level, the test signal detection circuit 311 enters a disable state, that is, a state in which the test signals Test_J and Test_K of the bus BS1 are not detected.

The test signal detection circuit 312 samples a signal sent to the bus BS2 when the operation mode is the HS mode with a clock from the timer 301, outputs a detection signal TJ_det2 at the H level when the test signal Test_J is detected, and outputs a detection signal TK_det2 at the H level when the test signal Test_K is detected.

The detection signal TJ_det2 is supplied to the test signal output circuit 113 via one of the input ends of an AND circuit 51, and the detection signal TK_det2 is supplied to the test signal output circuit 113 via one of the input ends of an AND circuit 61.

If the disconnect detection disable signal Cd_iv2 is at the H level, the test signal detection circuit 312 enters a disable state.

The test signals Test_J and Test_K are signals output in an HS test mode of the USB standard, and between the signals, the test signal Test_J is a signal with DP=400 mV and DM=0 mV, and the test signal Test_K is a signal with DP=0 mV and DM=400 mV. That is, the test signals Test_J and Test_K are both signals which are DC components.

The test signal output circuit 113 outputs the test signal Test_J to the bus BS1 if the detection signal TJ_det2 supplied via the AND circuit 51 is at the H level, and outputs the test signal Test_K to the bus BS1 if the detection signal TK_det2 supplied via the AND circuit 61 is at the H level.

In a similar manner, the test signal output circuit 123 outputs the test signal Test_J to the bus BS2 if the detection signal TJ_det1 supplied via the AND circuit 52 is at the H level, and outputs the test signal Test_K to the bus BS2 if the detection signal TK_det1 supplied via the AND circuit 62 is at the H level.

An initialization signal Ini is supplied from an external device such as the host apparatus 2 via a terminal NO. The initialization signal Ini is used to initialize the bus monitor circuit 30 and switch signal transfer to the route TR1. In the example, initialization is performed when the initialization signal Ini is at the H level.

The disconnect detection disable signal Cd_iv1 is supplied from an external device via the terminal N1. For the disconnect detection disable signal Cd_iv1, the terminal N1 may be fixed by connect to either the H level or the L level wiring on a circuit substrate.

The disconnect detection disable signal Cd_iv1 is supplied to the disconnect detection circuit 114 and the test signal detection circuit 311. Further, the disconnect detection disable signal Cd_iv1 is supplied to the other input terminal in an AND circuit 81 through logic inversion by a NOT circuit 91 and, and is supplied to the other input terminal in the AND circuit 52 and the other input terminal in the AND circuit 62 through logic inversion by a NOT circuit 72.

Therefore, if the disconnect detection disable signal Cd_iv1 is at the H level, the disconnect detection circuit 114 and the test signal detection circuit 311 are disabled, and the detection signal HC_det1 output from the disconnect detection circuit 114 is blocked and the detection signals TJ_det1 and TK_det1 output from the test signal detection circuit 311 are blocked.

The disconnect detection disable signal Cd_iv2 is supplied from an external device via the terminal N2. For the disconnect detection disable signal Cd_iv2, the terminal N2 may be fixed by connect to either the H level or the L level wiring on the circuit substrate.

The disconnect detection disable signal Cd_iv2 is supplied to the disconnect detection circuit 124 and the test signal detection circuit 312. Further, the disconnect detection disable signal Cd_iv2 is supplied to the other input terminal an the AND circuit 82 through logic inversion by a NOT circuit 92 and, and is supplied to the other input terminal in the AND circuit 51 and the other input terminal in the AND circuit 61 through logic inversion by a NOT circuit 71.

Therefore, if the disconnect detection disable signal Cd_iv2 is at the H level, the disconnect detection circuit 124 and the test signal detection circuit 312 are disabled, and the detection signal HC_det2 output from the disconnect detection circuit 124 is blocked and the detection signals TJ_det2 and TK_det2 output from the test signal detection circuit 312 are blocked.

The disconnect detection disable signal Cd_iv1 is an example of a first disconnect detection disable signal, and the disconnect detection disable signal Cd_iv2 is an example of a second disconnect detection disable signal.

The disconnect detection circuit 114 is an example of a first disconnect detection circuit, and the disconnect detection circuit 124 is an example of a second disconnect detection circuit. The test signal detection circuit 311 is an example of the first test signal detection circuit, the test signal detection circuit 312 is an example of the second test signal detection circuit, the test signal output circuit 113 is an example of the first test signal output circuit, and the test signal output circuit 123 is an example of a second test signal output circuit.

However, since the circuit device 10a has symmetry, it has no meaning as to which is the first or second.

In the USB standard, as for an eye pattern measured at the other end of the USB cable whose one end is connected to the host apparatus, a pattern with a small opening called far-end is allowed in consideration of attenuation by the USB cable.

On the other hand, if the host apparatus 2 is for in-vehicle use, for example, a configuration is assumed in which a USB cable is connected from the host apparatus to a connector provided in a console or the like in the vehicle and device apparatus is further connected to the connector. In such a configuration, since the eye pattern measured by the connector requires a near-end pattern, it is necessary to consider the attenuation of the USB cable.

Figure 8:
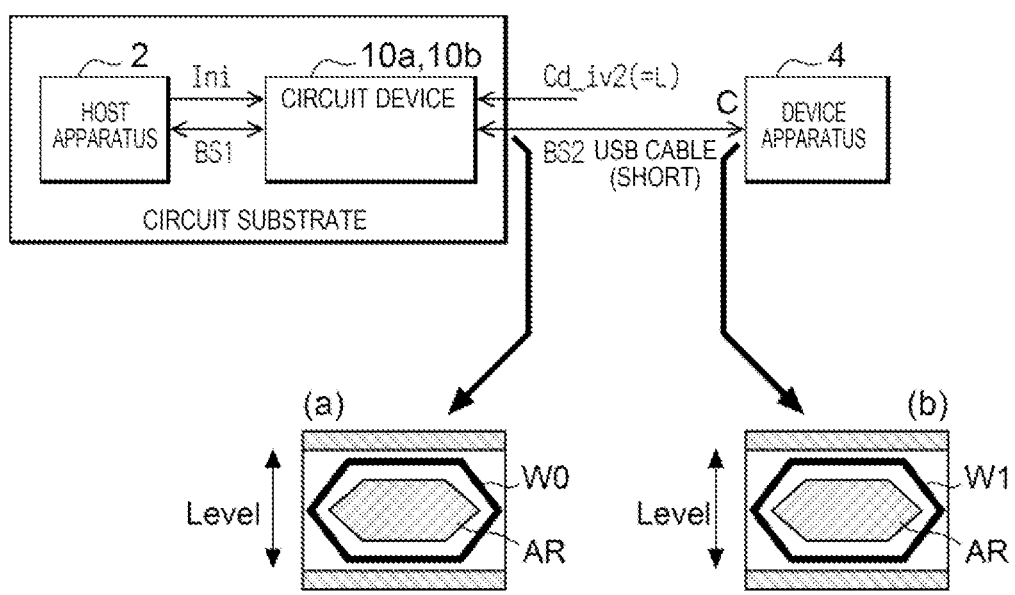
FIG. 8 is a diagram illustrating an example of a connect in the circuit device.

In order to compensate for such attenuation, the circuit device 10a is provided between the host apparatus 2 and the connector of the console. Specifically, as shown in FIG. 8, a configuration is adopted in which the host apparatus 2 and the circuit device 10a are mounted on the circuit substrate, the circuit device 10a is connected to a connector C with a USB cable, and the device apparatus 4 is further connected to the connector C.

According to the configuration, an attenuation amount of the USB cable is added in advance to the amplitude level of the packet transmitted from the host apparatus 2 by an amplitude adjustment function of the circuit device 10a, so that the attenuation amount of the USB cable can be compensated.

Here, before describing the superiority of the circuit device 10a according to the present embodiment, a circuit device 10b according to a comparative example will be described.

Figure 7:
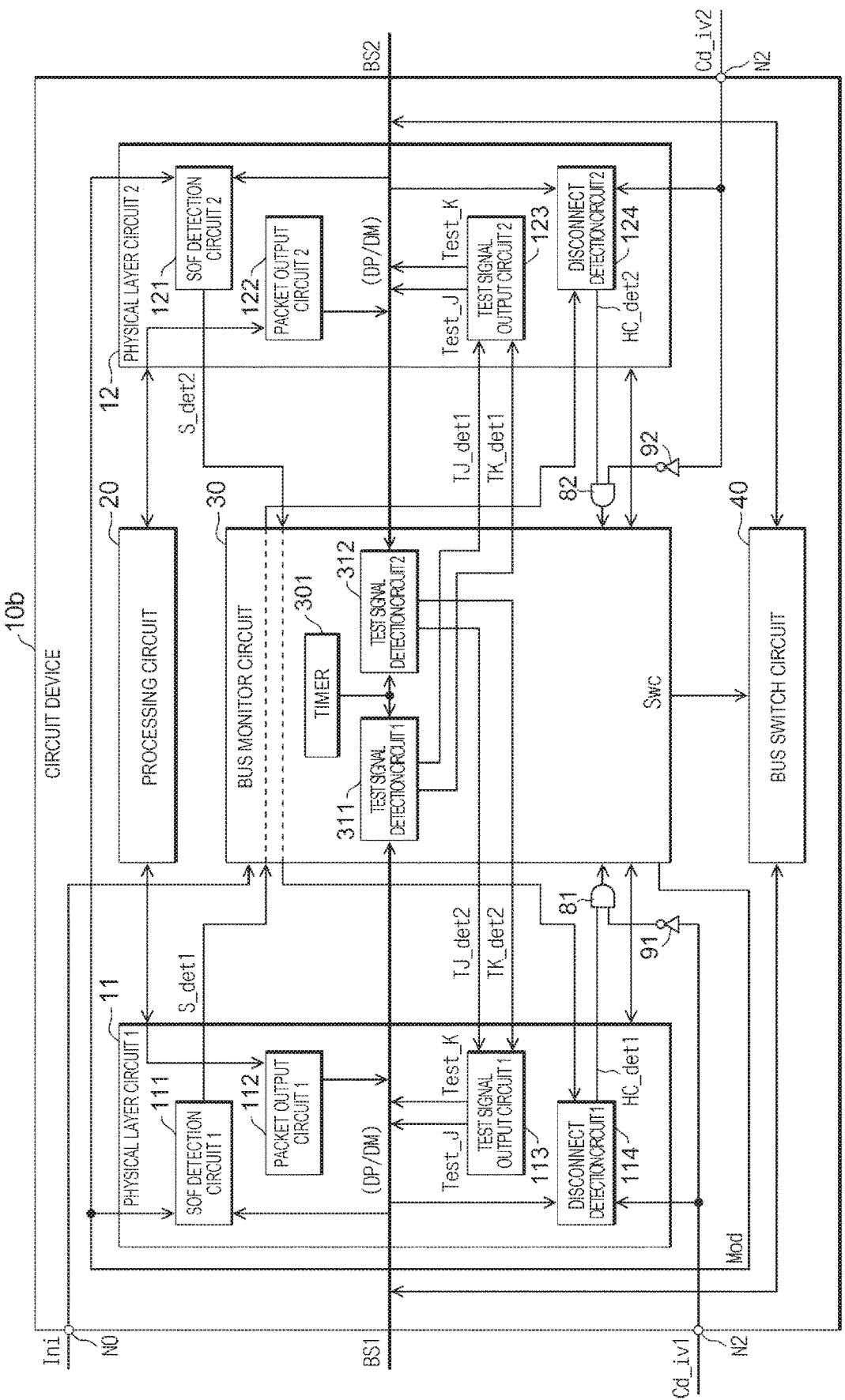
FIG. 7 is a diagram illustrating a configuration of a circuit device according to a comparative example.

FIG. 7 is a diagram illustrating a configuration of the circuit device 10b according to the comparative example. The circuit device 10b shown in FIG. 7 is different from the circuit device 10a shown in FIG. 3 in that, as the first point, the test signal detection circuit 311 is not disabled by the disconnect detection disable signal Cd_iv1 and the test signal detection circuit 312 is not disabled by the disconnect detection disable signal Cd_iv2, and secondly, as the second point, the detection signals TJ_det1 and TK_det1 are directly supplied to the test signal output circuit 123 and the detection signals TJ_det2 and TK_det2 are directly supplied to the test signal output circuit 113.

In regard to the second point, the circuit device shown in FIG. 7 does not include the AND circuits 51, 52, 61, and 62 and the NOT circuits 71 and 72 in FIG. 3.

Further, in the circuit device 10b according to the comparative example, it is also assumed that the USB cable connected to the connector C is relatively short as shown in FIG. 8. An eye pattern of a waveform W1 measured at the connector C of the console requires near-end as shown in FIG. 8, but when the USB cable is relatively short, an amplitude level amplification by the packet output circuit 112 may be small, so that a near-end requirement at the connector C can be satisfied by a waveform W0 whose amplitude is adjusted within a range not meeting a disconnect detection level.

FIG. 8 shows the eye pattern with the circuit device 10a or 10b as a measurement point. In the eye pattern, a hatched area AR indicates a prohibited area in which the waveforms W0 and W1 indicated by the signals DP and DM should not overlap.

Figure 9:
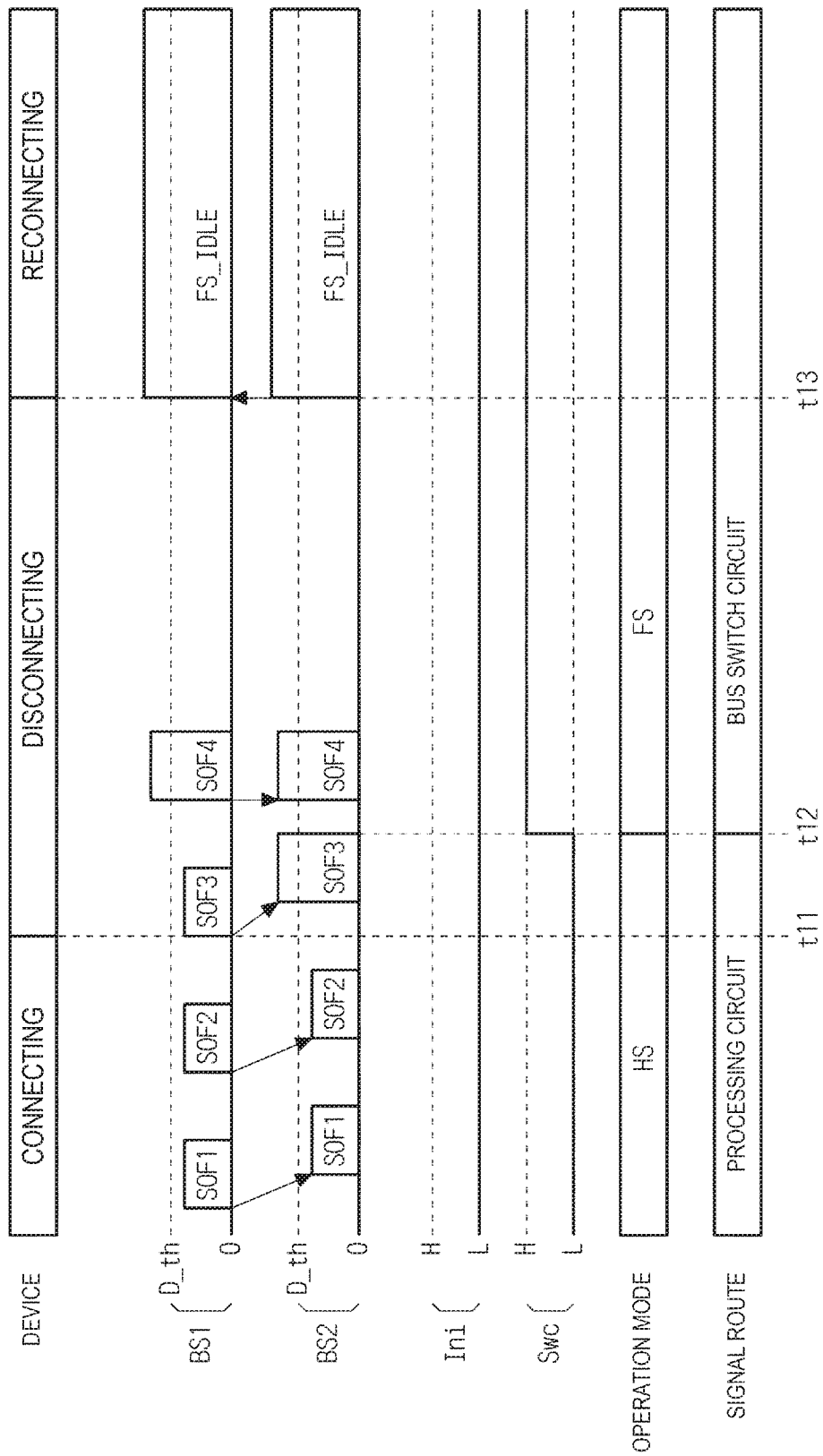
FIG. 9 is a diagram illustrating an operation example of the circuit device according to the comparative example.

FIG. 9 is a diagram illustrating an operation of the circuit device 10b according to the comparative example.

Here, in order to simplify the explanation, it is assumed that only an SOF is output as an HS packet sent from the host apparatus 2 to the circuit device 10b, that is, a packet in the HS mode. In FIG. 9, the packet SOF is represented as an SOF1, an SOF2, an SOF3, etc. in order to distinguish the packet SOF in time order.

Among the HS packets transmitted from the host apparatus 2 and transferred to the circuit device 10b, an EOP amplitude in the bus BS2 is less than a disconnect detection level D_th in the packets SOF1 and SOF2 transferred with the device apparatus 4 connected.

When the device apparatus 4 is actually disconnected at a time t11, the amplitude of the EOP of the packet SOF3 in the bus BS2 exceeds the disconnect detection level D_th. In the circuit device 10b, an increase in the EOP amplitude in the bus BS2 is detected by the disconnect detection circuit 124, and it is determined that the device is disconnected. By the determination, the bus monitor circuit 30 changes the signal Swc from the L level to the H level at a time t12 and turns on the bus switch circuit 40. Accordingly, the packet transfer is switched from the route TR2 to the route TR1.

After the time t12, the HS packet transmitted by the host apparatus 2 passes through the circuit device 10b via the bus switch circuit 40, but since the device is disconnected, the amplitude of the EOP of the packet SOF4 in the bus BS1 also increases. The host apparatus 2 detects the increase in amplitude by its own disconnect detection function and determines that device disconnect occurred.

In the state above, since both the circuit device 10b and the host apparatus 2 detect the device disconnect, the circuit device 10b and the host apparatus 2 transit to an initial state. Therefore, when the device apparatus 4 is connected again at a time t13, the state FS_IDLE due to pull-up of the signal DP in the device apparatus 4 is transmitted to the host apparatus 2 via the bus switch circuit 40 of the circuit device 10b, so that reconnect processing can be started.

Figure 10:
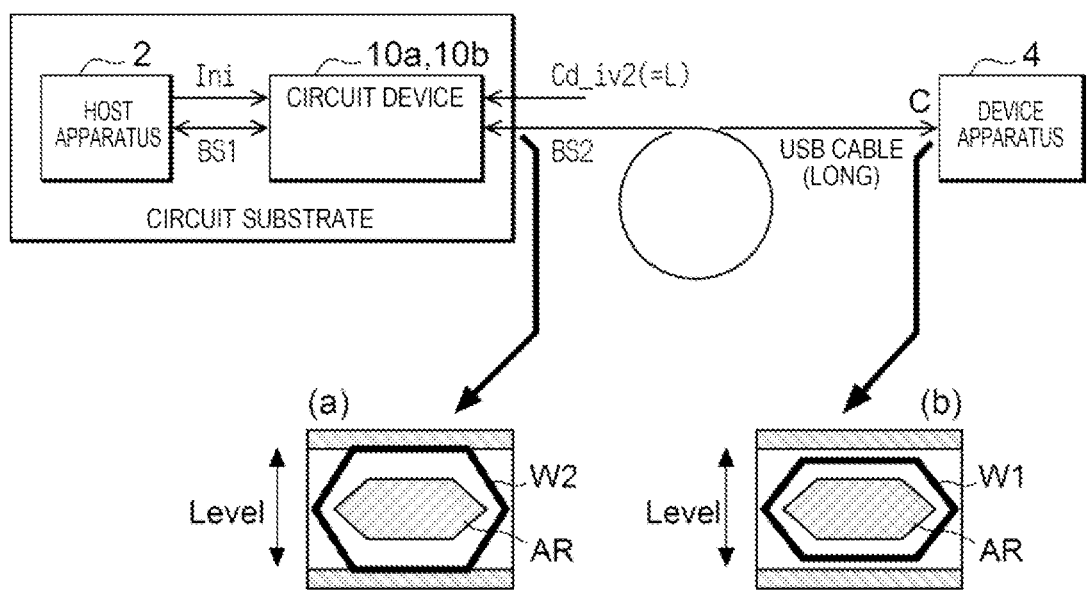
FIG. 10 is a diagram illustrating an example of a connect in the circuit device.

In FIGS. 8 and 9, although it is assumed that the USB cable of the bus BS2 is relatively short, when the USB cable is relatively long as shown in FIG. 10, a problem occurs in which the disconnect detection function of the circuit device 10b does not function normally. The point will be described.

In a connect example shown in FIG. 10, since the USB cable is relatively long, it is necessary to satisfy the requirement of near-end as shown in FIG. 10 by increasing amplitude level amplification by the amplitude adjustment function compared to FIG. 8. Specifically, as shown in FIG. 10, the requirement of the near-end in the connector C is satisfied by adjusting an amplitude level of a waveform W2 indicated by the signals DP and DM to increase to a vicinity of the disconnect detection level.

Figure 11:
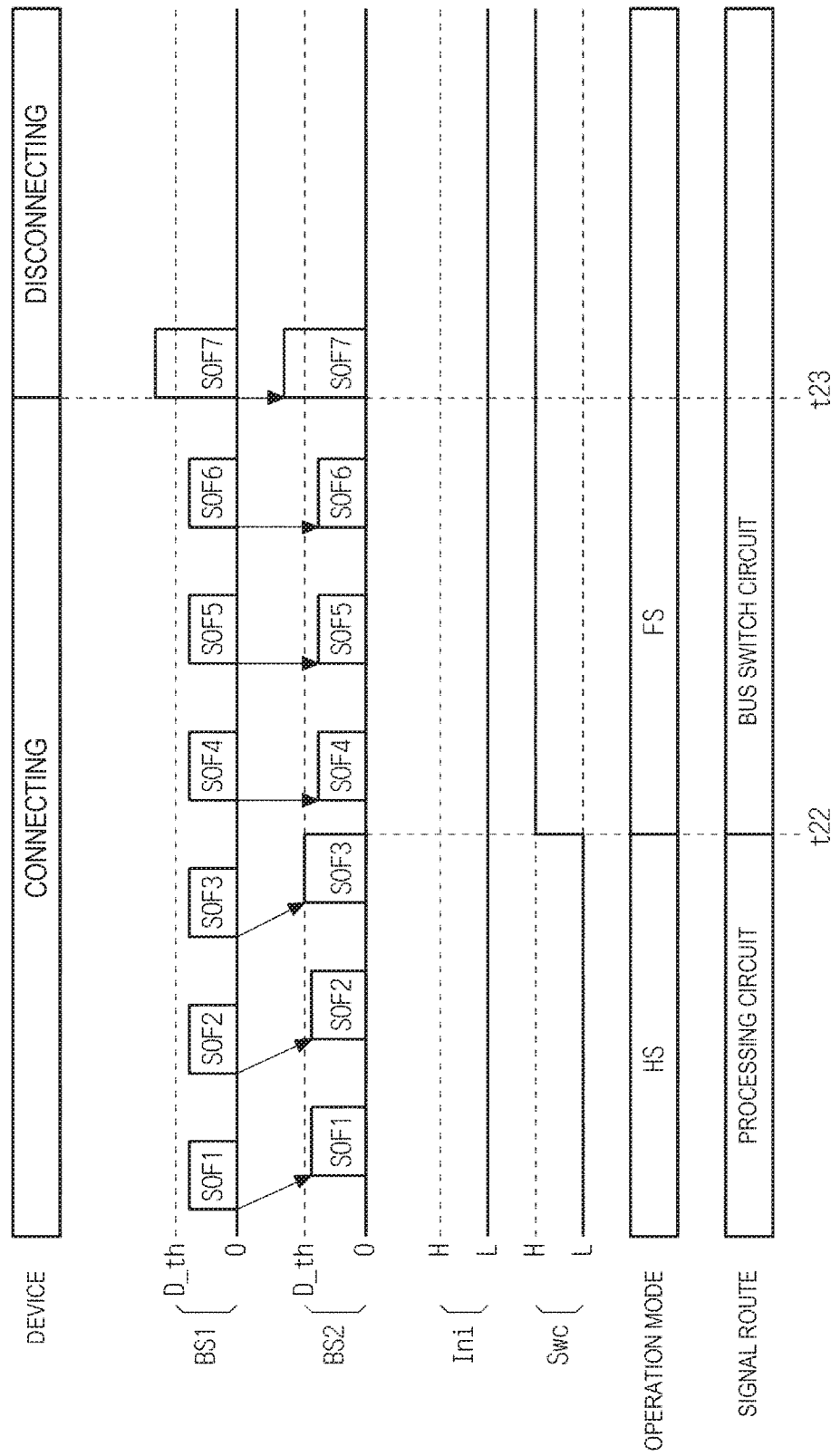
FIG. 11 is a diagram illustrating an operation example of the circuit device according to the comparative example.

FIG. 11 is a diagram for explaining erroneous detection of device disconnect in the circuit device 10b according to the comparative example. In FIG. 11, among the HS packets transmitted from the host apparatus 2 and transferred to the circuit device 10b, amplitudes of EOPs of packets SOF1 and SOF2 in the bus BS2 approach the disconnect detection level D_th, and finally some packets, for example, an amplitude of an EOP of a packet SOF3 in the BS2 may reach the disconnect detection level D_th.

In the circuit device 10b, an increase in the amplitude of the EOP in the bus BS2 is detected by the disconnect detection circuit 124, and even though the device apparatus 4 is connected, it is erroneously detected that device disconnect occurred. By the erroneous detection, the bus monitor circuit 30 changes the signal Swc from the L level to the H level at a time t22, thereby turning on the bus switch circuit 40 and switching the packet transfer to the route TR1.

After the time t22, the HS packet transmitted by the host apparatus 2 passes through the circuit device 10b via the bus switch circuit 40, but since the device is connected, an amplitude of an EOP of a packet SOF4 in the bus BS1 does not increase.

The host apparatus 2 transmits the HS packet until the device apparatus 4 is actually disconnected, and the HS packet passes through the circuit device 10b via the bus switch circuit 40.

When the device apparatus 4 is actually disconnected at a time t23 and an amplitude level of an EOP of a packet SOF1 in the bus BS1 exceeds the disconnect detection level D_th, the host apparatus 2 can detect disconnect by its own disconnect detection function to determine that the device disconnect occurred.

In this manner, when the amplitude of the HS packet transmitted from the host apparatus 2 is adjusted near the disconnect detection level D_th, it may be erroneously detected that the device disconnects occurred. In this case, since a state in which the HS packet is transferred via the bus switch circuit 40 continues, a function of the circuit device 10b becomes meaningless.

Figure 12:
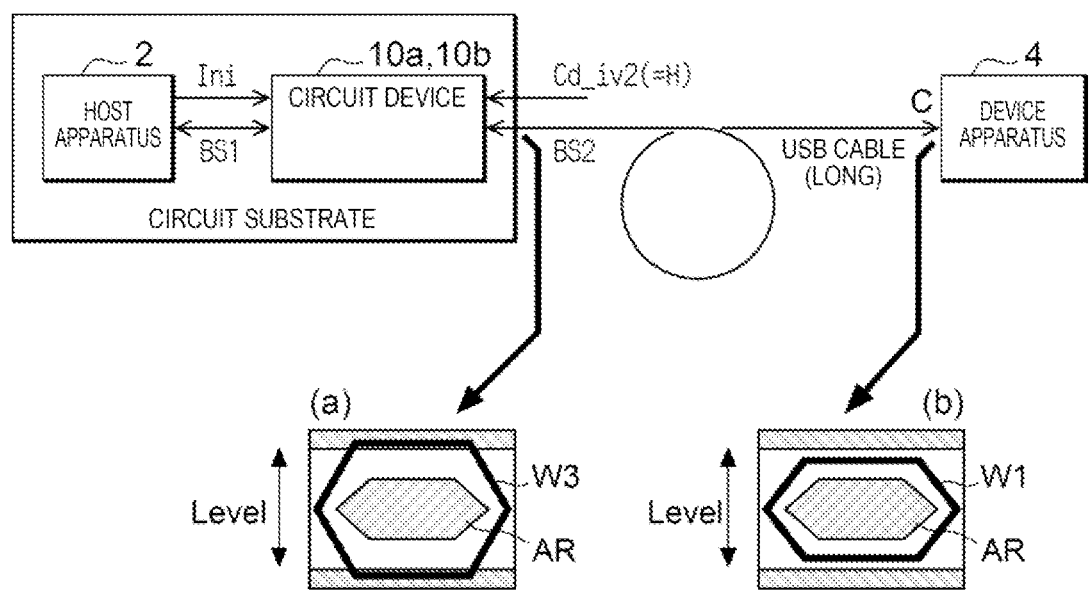
FIG. 12 is a diagram illustrating an example of a connect in the circuit device.

In order to prevent such erroneous detection of the device disconnect, the circuit device 10b can be set to disable the disconnect detection function. Specifically, as shown in FIG. 12, the disconnect detection disable signal Cd_iv2 with the H level is supplied from an outside, and the disconnect detection function of the disconnect detection circuit 124 is set to be disabled. In FIG. 12, as in FIG. 10, it is assumed that a USB cable of the bus BS2 connect the circuit device 10b with the device apparatus 4 is relatively long.

Figure 13:
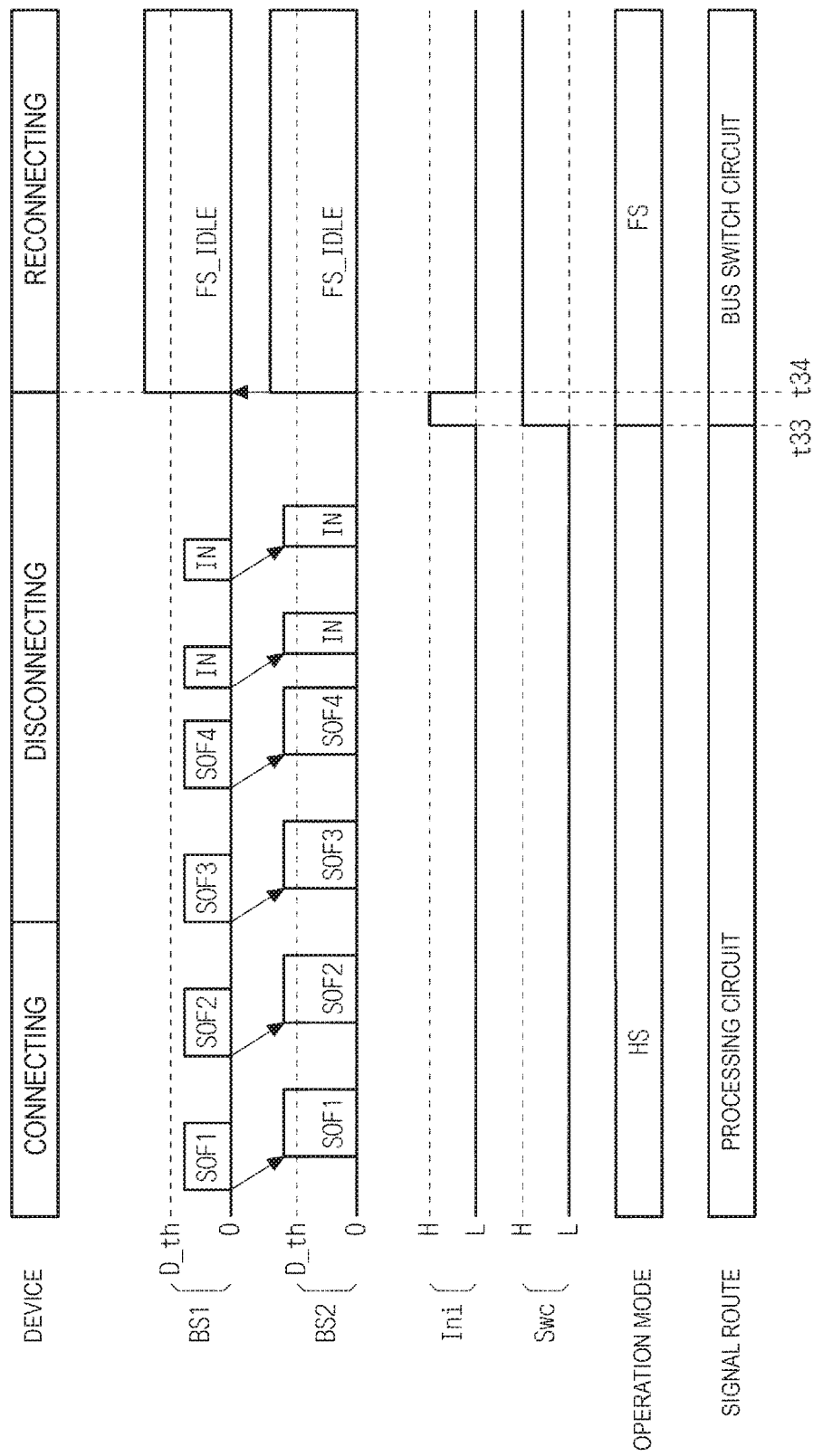
FIG. 13 is a diagram illustrating an operation example of the circuit device according to the comparative example.

FIG. 13 is a diagram for explaining disabling of the disconnect detection function.

When the disconnect detection function is disabled, the device disconnect is not erroneously detected as described with reference to FIG. 11, and the HS packet transmitted from the host apparatus 2 continues to be transferred via the processing circuit 20. Accordingly, since amplitude adjustment of the HS packet transmitted from the host apparatus 2 can be performed within a range exceeding the disconnect detection level D_th as shown by a waveform W3 in FIG. 12, the requirement of near-end can be satisfied with a margin.

However, since the circuit device 10b cannot detect the device disconnect when the disconnect detection function is disabled, it is necessary that the host apparatus 2 detects the device disconnect instead, notifies the circuit device 10b of the disconnect detection result, and transition the circuit device 10b to an initial state.

As an example, when a packet response from the device apparatus 4 is interrupted, the host apparatus 2 determines that the device is disconnected, sets the initialization signal Ini to the H level, and notifies the circuit device 10b of the device disconnect. When the initialization signal Ini becomes the H level at a time t33 in FIG. 13, the circuit device 10b is initialized, and the packet transfer can be switched to the route TR1 via the bus switch circuit 40.

In the circuit device 10b switched to the route TR1 by the initialization, after a time t34 at which the initialization signal Ini returns to the L level, the state FS_IDLE of the bus BS2 due to device reconnect is transmitted to the host apparatus 2 of the bus BS1 via the bus switch circuit 40 of the circuit device 10b. Therefore, the host apparatus 2 can start reconnecting processing.

Here, there is no problem when the device disconnect is detected quickly in the host apparatus 2. However, when it takes time until the device disconnect is detected in the host apparatus 2 and notification to the circuit device 10b is delayed, there is a problem that the state FS_IDLE due to the device reconnect is erroneously detected as the test signal Test_J.

Figure 14:
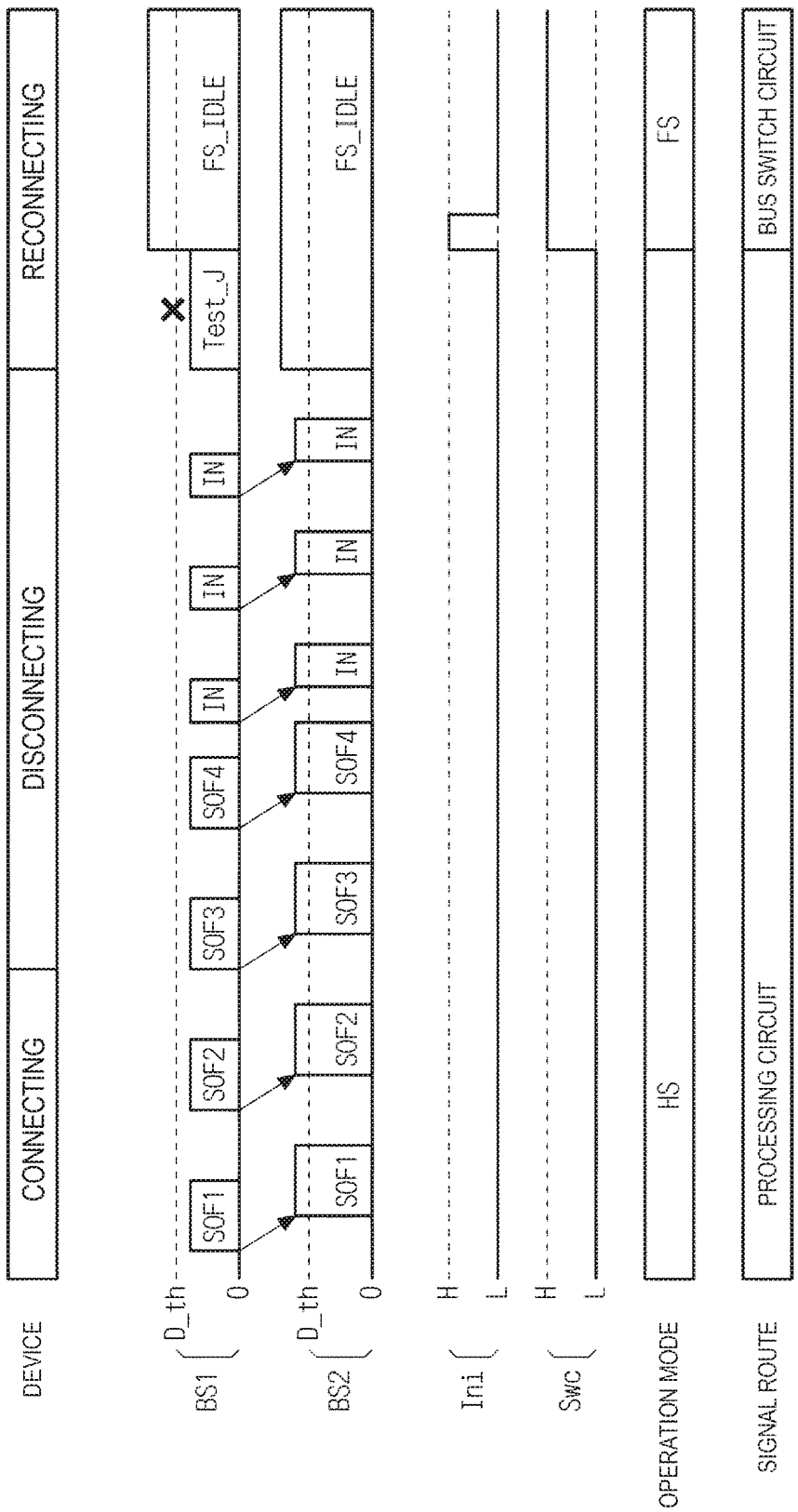
FIG. 14 is a diagram illustrating an operation example of the circuit device according to the comparative example.

FIG. 14 is a diagram for explaining erroneous detection due to device reconnect.

In FIG. 14, as in FIG. 12, although it is assumed that the USB cable of the bus BS2 connect the circuit device 10b with the device apparatus 4 according to the comparative example is relatively long and the disconnect detection function of the disconnect detection circuit 124 corresponding to the device apparatus 4 is disabled, an example is shown in which device reconnect processing is performed before the bus switch circuit 40 is turned on.

In the example of FIG. 14, as in the example of FIG. 13, since the circuit device 10b cannot detect the device disconnect when the disconnect detection function is disabled, it is necessary that the host apparatus 2 detects the device disconnect instead, notifies the circuit device 10b of the disconnect detection result, and transition the circuit device 10b to an initial state. However, the device disconnect detection in the host apparatus 2 takes time to determine presence and absence of a packet response from the device apparatus 4, and notification of the device disconnect detection to the circuit device 10b may be delayed.

When the device is reconnected before the bus switch circuit 40 is turned on in the circuit device 10b due to the delay of the notification, the state FS_IDLE of the bus BS2 resulting from the reconnect is recognized as the test signal Test_J in the HS test mode in the test signal detection circuit 312. This is because, as described above, the test signal Test_J is a signal with DP=400 mV, the state FS_IDLE is also the pull-up of the signal DP in the device apparatus 4, and both are DC, so it is difficult to distinguish the test signal Test_J and the state FS_IDLE.

When the state FS_IDLE of the bus BS2 is recognized as the test signal Test_J by the test signal detection circuit 312, the detection signal TJ_det1 becomes the H level, and the test signal output circuit 113 erroneously transmits the test signal Test_J to the bus BS1 toward the host apparatus 2.

At this time, when the host apparatus 2 continues the processing of detecting the device disconnect, the HS packet transmitted from the host apparatus 2 and the test signal Test_J erroneously transmitted by the test signal output circuit 113 may collide with each other on the bus BS1.

Therefore, the circuit device 10a according to the present embodiment is configured such that the disconnect detection disable signal Cd_iv1 not only disables the disconnect detection circuit 114 and blocks the detection signal HC_det1, but also disables the test signal detection circuit 311 and blocks the detection signals TJ_det1, TK_det1. Furthermore, a configuration is provided such that the disconnect detection disable signal Cd_iv2 not only disables the disconnect detection circuit 124 and blocks the detection signal HC_det2, but also disables the test signal detection circuit 312 and blocks the detection signals TJ_det2, TK_det2.

Accordingly, even though detection processing of device disconnect in the host apparatus is delayed and the device apparatus is reconnected before notification of the initialization signal Ini, it is possible to prevent a test signal from being erroneously transmitted toward the host apparatus because a detection function of the test signals Test_J and Test_K is disabled. Further, since the test signal is not erroneously transmitted, collision with the HS packet transmitted by the host apparatus is also avoided.

Specifically, as shown in FIG. 1, when the host apparatus 2 is connected to the bus BS1 and the connect or disconnect of the device apparatus 4 becomes a problem in the bus BS2, the detection function of the test signals Test_J and Test_K by the test signal detection circuit 312 is disabled even though the detection processing of the device disconnect in the host apparatus 2 is delayed and the device apparatus 4 is reconnected before the notification of the initialization signal Ini. Therefore, it is possible to prevent the test signal from being erroneously transmitted to the bus BS1 by the test signal output circuit 113 and the collision with the HS packet transmitted from the host apparatus 2 to the bus BS1 is also avoided.

Figure 4:
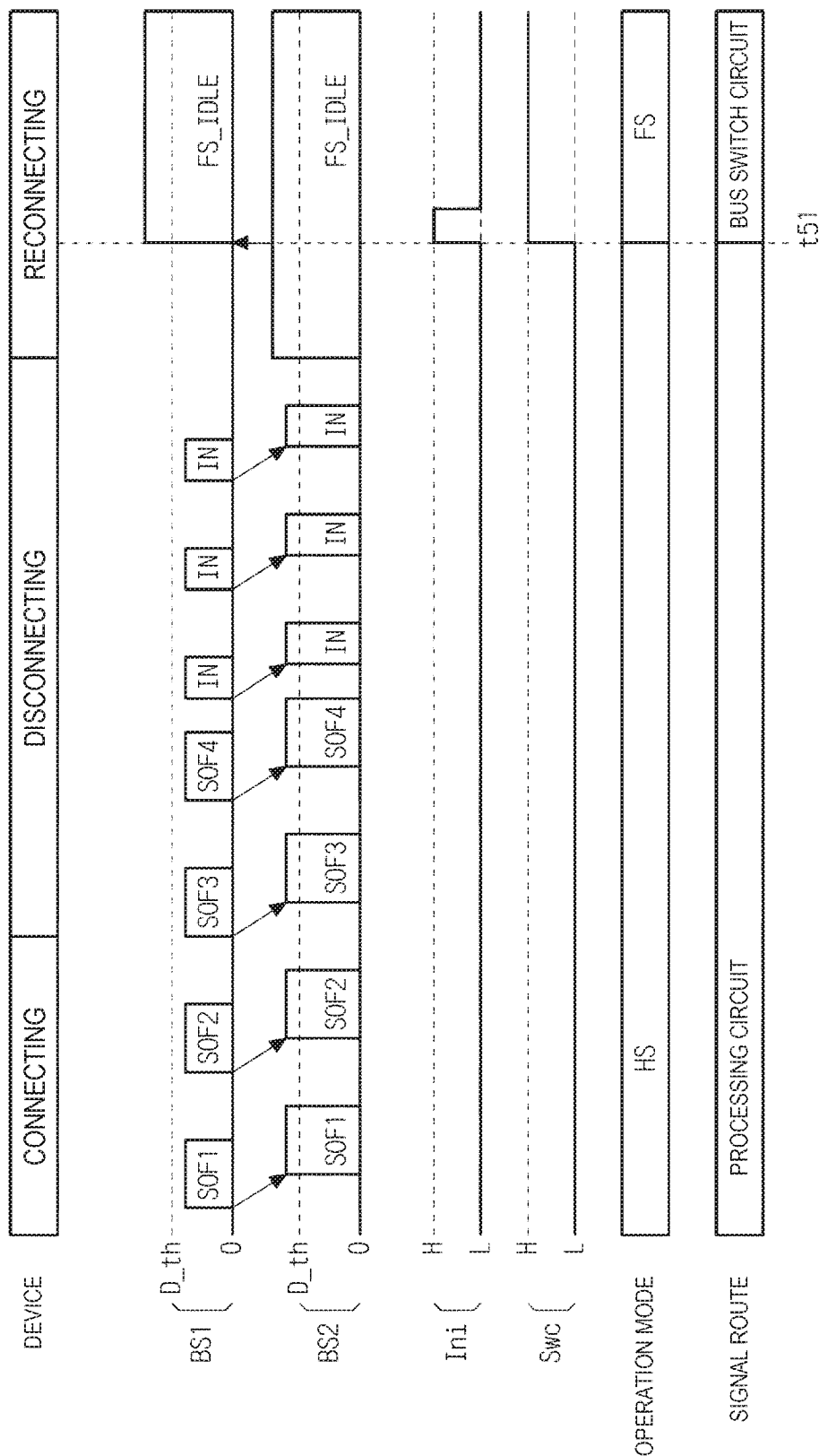
FIG. 4 is a diagram illustrating an operation example of the circuit device.

FIG. 4 is a diagram for explaining prevention of erroneous transmission or the like of a test signal by the circuit device 10a according to the present embodiment.

In FIG. 4, as in FIG. 12, it is assumed that the USB cable of the bus BS2 connect the circuit device 10a with the device apparatus 4 is relatively long. Further, FIG. 4, as in FIG. 14, is an operation example assuming a case in which the disconnect detection function of the disconnect detection circuit 124 is disabled by the H level of the disconnect detection disable signal Cd_iv2 and a device is reconnected before the initialization of the circuit device 10a.

However, FIG. 4 differs from FIG. 14 in that the detection function of the test signals Test_J and Test_K by the test signal detection circuit 312 is disabled at the same time as the disconnect detection function of the disconnect detection circuit 124 is disabled. Therefore, since the state FS_IDLE of the bus BS2 due to reconnect of the device apparatus 4 is not erroneously transmitted to the bus BS1 as the test signal Test_J, the bus BS1 holds a state SE0 which is a state HS_IDLE. Accordingly, even though the host apparatus 2 which performs the device disconnect detection processing transmits the HS packet to the bus BS1, it is possible to avoid a collision on the bus BS1.

After the reconnect of the device apparatus 4, the host apparatus 2 notifies the device disconnect by setting the initialization signal Ini to the H level at a time t51 by the device disconnect detection processing. By the notification, the circuit device 10a turns on the bus switch circuit 40 and switches to the route TR1. By the switching, the bus BS1 is directly connected to the bus BS2, so the state FS_IDLE passes through the circuit device 10a. Therefore, the host apparatus 2 can appropriately start the device reconnect processing after performing the device disconnect detection processing.

In the circuit device 10a according to the embodiment, a configuration is used in which two signals of the disconnect detection disable signals Cd_iv1 and Cd_iv2 are used in order to make the disabling of the disconnect detection function and the disabling of the detection function of the test signals Test_J, Test_K correspond to each of the buses BS1 and BS2, but it may be constituted with one signal. In the case of inputting one signal, the device may be configured to disable the disconnect detection circuit and the test signal detection circuit on the device side and the test signal output circuit on the host side.

Further, in the circuit device 10a according to the embodiment, in the case of the disconnect detection circuit 114, when the detection of the device disconnect by the disconnect detection circuit 114 is disabled, both disabling the test signal detection circuit 311 and blocking the supply of the detection signals TJ_det1 and TK_det1 to the test signal output circuit 123 are performed, but either one may be performed. Even in performing either one, it does not change the fact that when the detection of the device disconnects by the disconnect detection circuit 114 is disabled, the detection of the test signals Test_J and Test_K by the test signal detection circuit 311 is substantially disabled.

It is configured such that the AND circuits 51 and 61 block the supply of the detection signals TJ_det2 and TK_det2 to the test signal output circuit 113 and the AND circuits 52 and 62 block the supply of the detection signals TJ_det1 and TK_det1 to the test signal output circuit 123, but it may be configured to be blocked by another logic circuit, or may be configured to be blocked by another circuit, for example, a switch. That is, a configuration for blocking is not an issue.

Figure 15:
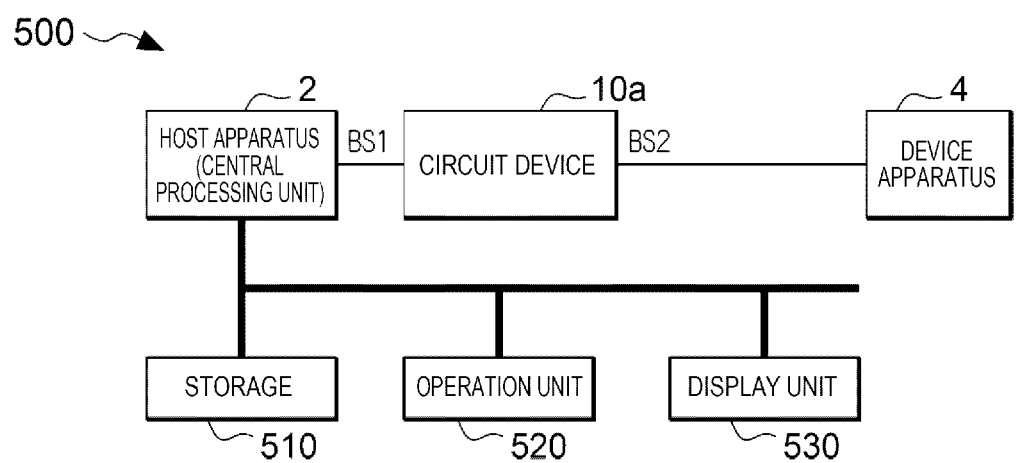
FIG. 15 is a diagram illustrating an example of an electronic apparatus to which the circuit device according to the embodiment is applied.

FIG. 15 is a diagram illustrating an example of an electronic apparatus 500 including the circuit device 10a according to the embodiment. The electronic apparatus 500 includes the circuit device 10a and the host apparatus 2. The host apparatus 2 here is an example of a central processing unit. The host apparatus 2 is connected to the circuit device 10a via the bus BS1. Further, the circuit device 10a is connected to, for example, the device apparatus 4 via the bus BS2.

For example, the host apparatus 2 may be realized by a processor such as a CPU or an MPU, or may be realized by a circuit substrate on which one or more semiconductor integrated circuits, electronic components, or the like are mounted.

The electronic apparatus 500 may further include a storage 510, an operation unit 520, and a display unit 530. The storage 510 stores data, and its function is realized by a semiconductor memory, a hard disk drive (HDD), or the like. The operation unit 520 is for a user to perform an input operation, and can be realized by an operation device such as an operation button, and a touch panel display. The display unit 530 displays various types of information and can be realized by a display such as liquid crystal and organic EL. When a touch panel display is used as the operation unit 520, the touch panel display also functions as the operation unit 520 and the display unit 530.

Examples of the electronic apparatus 500 include in-vehicle apparatus, printing apparatus, projection apparatus, a robot, head-mounted display apparatus, biological information measurement apparatus, measurement apparatus which measures physical quantities such as distance, time, flow speed, or flow rate, network-related apparatus such as a base station or a router, a content providing apparatus which distributes content, a video apparatus such as a digital camera or a video camera, or the like.

What is claimed is:

1. A circuit device comprising:
    a first physical layer circuit to which a first bus with a USB standard is coupled;
    a second physical layer circuit to which a second bus with the USB standard is coupled;
    a bus switch circuit turning on or off a connect between the first bus and the second bus;
    a processing circuit performing transfer processing which transmits a packet received from the first bus via the first physical layer circuit to the second bus via the second physical layer circuit and transmits a packet received from the second bus via the second physical layer circuit to the first bus via the first physical layer circuit, during a period in which the bus switch circuit is turned off; and a bus monitor circuit monitoring the first bus and the second bus, wherein the first physical layer circuit includes a first disconnect detection circuit which detects device disconnect in the first bus, the bus monitor circuit includes a first test signal detection circuit which detects whether or not a test signal is output to the first bus, and when detection of the device disconnect by the first disconnect detection circuit is disabled, detection of the test signal by the first test signal detection circuit is disabled.

2. The circuit device according to claim 1, wherein disabling the detection of the device disconnect by the first disconnect detection circuit and disabling the detection of the test signal by the first test signal detection circuit are specified by a first disconnect detection disable signal.

3. The circuit device according to claim 1, wherein the second physical layer circuit includes a second disconnect detection circuit which detects device disconnect in the second bus, the bus monitor circuit includes a second test signal detection circuit which detects whether or not the test signal is output to the second bus, and when detection of the device disconnect by the second disconnect detection circuit is disabled, detection of the test signal by the second test signal detection circuit is disabled.

4. The circuit device according to claim 3, wherein disabling the detection of the device disconnect by the second disconnect detection circuit and disabling the detection of the test signal by the second test signal detection circuit are specified by a second disconnect detection disable signal.

5. The circuit device according to claim 4, wherein the first physical layer circuit includes a first test signal output circuit which outputs the test signal to the first bus when the second test signal detection circuit detects that the test signal is output to the second bus, and the second physical layer circuit includes a second test signal output circuit which outputs the test signal to the second bus when the first test signal detection circuit detects that the test signal is output to the first bus.

6. The circuit device according to claim 5, wherein when detection of the device disconnect by the first disconnect detection circuit is disabled and detection of the test signal by the first test signal detection circuit is disabled, an output of the test signal by the second test signal output circuit is disabled, and when detection of the device disconnect by the second disconnect detection circuit is disabled and detection of the test signal by the second test signal detection circuit is disabled, an output of the test signal by the first test signal output circuit is disabled.

7. An electronic apparatus comprising:

the circuit device according to claim 1; and a central processing unit connected to the first bus.

* * * * *